United States Patent
Chafle et al.

(10) Patent No.: US 7,669,074 B2
(45) Date of Patent: *Feb. 23, 2010

(54) METHOD FOR FAULT HANDLING IN A CO-OPERATIVE WORKFLOW ENVIRONMENT

(75) Inventors: Girish B. Chafle, New Delhi (IN); Sunil Chandra, New Delhi (IN); Pankaj Kankar, New Delhi (IN); Vijay Mann, Haryana (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/193,870

(22) Filed: Aug. 19, 2008

(65) Prior Publication Data

US 2008/0307256 A1     Dec. 11, 2008

Related U.S. Application Data

(63) Continuation of application No. 11/260,645, filed on Oct. 27, 2005, now Pat. No. 7,475,275.

(51) Int. Cl.
    *G06F 11/00* (2006.01)
(52) U.S. Cl. .......................................... 714/4
(58) Field of Classification Search ............. 714/4; 709/224, 223
    See application file for complete search history.

(56) References Cited

U.S. PATENT DOCUMENTS

| | | | | |
|---|---|---|---|---|
| 5,581,691 A * | 12/1996 | Hsu et al. | ...... | 714/15 |
| 5,870,545 A * | 2/1999 | Davis et al. | ...... | 709/201 |
| 5,878,206 A * | 3/1999 | Chen et al. | ...... | 714/19 |
| 5,940,839 A * | 8/1999 | Chen et al. | ...... | 707/202 |
| 6,273,622 B1 * | 8/2001 | Ben-David | ...... | 709/230 |
| 6,311,219 B1 * | 10/2001 | Factor | ...... | 709/229 |
| 6,314,463 B1 * | 11/2001 | Abbott et al. | ...... | 709/224 |
| 6,317,786 B1 * | 11/2001 | Yamane et al. | ...... | 709/224 |
| 6,460,070 B1 * | 10/2002 | Turek et al. | ...... | 709/202 |
| 6,578,159 B1 * | 6/2003 | Kitagawa et al. | ...... | 714/15 |
| 6,594,775 B1 * | 7/2003 | Fair | ...... | 714/4 |
| 6,650,647 B1 * | 11/2003 | Ishikawa et al. | ...... | 370/400 |

(Continued)

OTHER PUBLICATIONS

Issarny et al., "Coordinated Forward Eror Recovery for Composite Web Services," IEEE Symposium on Reliable Distributed Systems, Florence, Italy, Oct. 2003, pp. 1-10.

(Continued)

*Primary Examiner*—Robert Beausoliel
*Assistant Examiner*—Amine Riad
(74) *Attorney, Agent, or Firm*—Gibb I.P. Law Firm LLC (57) ABSTRACT

Embodiments herein provide a fault-handling scheme based on forward recovery for cooperative workflow environments. The fault handling scheme relies on the correct placement of transaction scopes and their associated fault and compensation handlers for maintaining correct application semantics, a fault propagation scheme for forwarding faults to a workflow component that has the corresponding fault handler, and a distributed mechanism for collecting data of completed workflow components to facilitate recovering from faults. The fault handling scheme makes use of control flow messages to facilitate compensation of nested transaction scopes (residing in different components). The workflow components are also modified with additional code for aiding with fault propagation and fault recovery.

5 Claims, 9 Drawing Sheets

U.S. PATENT DOCUMENTS

| | | | | |
|---|---|---|---|---|
| 6,718,481 B1 * | 4/2004 | Fair | ............................... | 714/4 |
| 6,777,624 B2 * | 8/2004 | Hamamoto | .............. | 177/25.13 |
| 6,782,388 B2 * | 8/2004 | Majewski et al. | ............. | 707/10 |
| 6,782,424 B2 * | 8/2004 | Yodaiken | .................... | 709/224 |
| 6,918,053 B1 * | 7/2005 | Thatte et al. | .................. | 714/16 |
| 6,983,395 B2 * | 1/2006 | Chen et al. | .................... | 714/4 |
| 2006/0259526 A1 * | 11/2006 | Booz et al. | .................. | 707/202 |

OTHER PUBLICATIONS

"Web Service Distribution System Over the World Wide Web Using Web Services Description Language (WSDL) Standare Including Implementation for Uniformly Displaying All Fault Conditions in WSDL Message Format," Doss AUS9-2004-1045.txt, pp. 1-2.

* cited by examiner

METHOD FOR FAULT HANDLING IN A CO-OPERATIVE WORKFLOW ENVIRONMENT

CROSS-REFERENCE TO RELATED APPLICATIONS

This application is a Continuation of U.S. application Ser. No. 11/260,645 filed Oct. 27, 2005, the complete disclosure of which, in its entirety, is herein incorporated by reference.

BACKGROUND OF THE INVENTION

1. Field of the Invention

The embodiments of the invention generally relate to computer systems, and, more particularly, to co-operative workflow environments running on those computer systems.

2. Description of the Related Art

Co-operative workflow environments consist of multiple workflow components deployed at different locations in a distributed infrastructure. Each workflow component works co-operatively with other components to complete an overall global task. The workflows communicate directly with each other (rather than through a centralized controller) in an asynchronous manner to transfer data and control when necessary. For example, cross organizational business processes can be implemented using co-operating workflows. Another example is decentralized orchestration of composite web services which is used for either performance benefits (in terms of throughput and response time) or for orchestrating composite web services in constrained data flow environments.

Fault handling (fault propagation and fault recovery) in general is essential in distributed systems in order to correct the effects of partial changes to the state of a system and restore the system to an error free state. In scenarios where there is support for fault recovery, fault propagation is necessary so that faults are propagated to the correct set of fault handling functions. In case of co-operative workflow the components typically execute independently. Thus, a fault occurring in one component will typically not be noticed by other components residing on the outgoing communication paths of that component or in paths parallel to that component. Furthermore, a client issuing a request is not notified about a fault occurring in a workflow component. This is hardly an issue in workflows with centralized control as the faults are generated locally on the centralized controller and the client can be notified easily and he can reissue the requests or take corrective steps. Hence, fault propagation (even in absence of fault recovery) is even more essential for co-operating workflows.

Two types of approaches are generally used for fault recovery in distributed systems—backward error recovery and forward error recovery. Forward error recovery (exception handling schemes) is based on the use of redundant data that repairs the system by analyzing the detected fault and putting the system into a correct state. In contrast, backward error recovery returns the system to a pervious (presumed to be) fault-free state without requiring detailed knowledge of the faults.

Various workflow systems (including systems that employ workflow partitioning) relied heavily on backward error recovery (although forward error recovery can also be used here) as most of the underlying resources were usually under the control of a single domain. These are specified using proprietary languages and usually do not handle nested scopes.

Other conventional solutions have focused on forward error recovery schemes enabling coordinated handling of concurrent exceptions using the concept of Coordinated Atomic Action (CA Action), which was later extended to the web services domain—Web Service Composition action or WSCA.

Fault recovery becomes a little more complex for cooperative workflows as the different workflow components may be distributed across different autonomous domains. Transactions (which fall under backward error recovery mechanisms), which have been successfully used in providing fault tolerance to distributed systems, are not suited in such cases because of various reasons. For example, management of transactions that are distributed over workflow components deployed on different domains typically requires cooperation among the transactional supports of individual domains. These transactional systems may not be compliant with each other and may not be willing to do so, given their intrinsic autonomy and the fact that they span different administrative domains. In addition, locking resources until the termination of the embedding transaction is in general not appropriate for cooperative workflows, still due to their autonomy, and also to the fact that they potentially have a large number of concurrent clients that will not stand extensive delays.

In co-operating workflows, propagation of faults (either programmed exceptions or exceptions arising due to failure of underlying resources) and recovery from those become complicated due to the following challenges:

First, there is no centralized global state as different workflow components execute on different nodes and communicate asynchronously with each other. In contrast, in workflows with centralized control, the entire state and all the faults remain localized to that central workflow component.

Second, correct placement of transaction scopes, fault handlers and compensation handlers in co-operating workflows is essential in order to maintain correct semantics of the application. Furthermore, the workflow components generally need to be modified with additional code to correctly forward and handle faults.

Third, different workflow components may execute at different times and have either overlapping or different life-cycles—which means that there is generally no single context available where all faults can be handled. Furthermore, workflow specification languages like BPEL4WS provides "scope" activities to define transaction scopes and associate fault handlers and compensation handlers with them to create a fault handling and recovery context. They also ensure fault recovery semantics in which compensation handlers are invoked in their reverse order of completion of their respective scopes. This complicates fault handling and fault recovery when the different workflow components run at different or overlapping times. A single transaction scope might span across various workflow components and the partitioned scopes (which reside in different workflow components) might have different lifetimes and as a result, their data is no longer available for compensating them. Thus, a mechanism is required to store the data of already completed "transaction scopes" so that it can be used for compensating them in case of a fault.

In addition, a fault occurring in one workflow component should not lead to a workflow component (that is expecting inputs from multiple workflow components) waiting indefinitely for an input from the erroneous component. This is an issue in co-operating workflows with distributed control flow as different workflow components can execute concurrently and forward their results to other workflow components for further processing. This will result in system resources being held up by the waiting workflow component and the performance of the system will go down over a period of time as the number of faults becomes significant.

In addition to augmenting the existing forward error recovery mechanisms, additional fault propagation schemes are needed for handling faults in cooperative workflows. Not much work has been done in this area. Therefore, there remains a need for a new technique capable of providing fault handling in a cooperative workflow environment.

SUMMARY OF THE INVENTION

In view of the foregoing, embodiments of the invention provide a forward error recovery scheme for co-operating workflows, wherein the workflows are specified using languages such as BPEL4WS, which have support for fault handling and recovery through fault handlers and compensation handlers. In any such set of cooperative workflows, there will be various blocks of activities where different activities will reside in different workflow components. However, there will be scenarios, where an entire block of activities has to be executed as a single action (need not be atomic though) and it might be desirable to have common fault handling and compensating code for that block. In this case, that entire block of activities can be placed inside a transaction scope and set of fault handlers and compensation handlers can be associated with that transaction scope. These transaction scopes can be nested within one another and the application semantic will usually require that the compensation be held in the reverse order of execution of these scopes. There will be other cases where a workflow, written with centralized control flow, goes through automatic or manual partitioning (or decomposition) and a set of cooperative workflow components are generated as a result. In such cases, placement of transaction scopes and their associated fault and compensation handlers is important to maintain correct fault handling semantics. In both these scenarios, the blocks of activities inside a transaction scope are distributed amongst different workflow components.

Embodiments of the invention comprise a placement strategy for transaction scopes such that the end of each scope resides in a workflow component referred to as the root workflow component for that scope and the rest of the activities are placed in different workflow components (referred to as non root workflow components). The fault and the compensation handlers corresponding to the transaction scope are placed in the root workflow component. This placement scheme ensures correct workflow semantics even in cases when each workflow component has a different lifetime and might execute on different nodes. The workflow components are modified with additional fault handling code to propagate faults to either (whichever comes earlier in the control flow path): a) the next join or the fork workflow component, on all the outgoing links (communication paths) for that component or b) the root workflow component for that scope. This ensures that none of the workflow components are left waiting for input (and thereby holding on to resources) on fault and end gracefully. For execution of the compensation handlers and fault handlers, the workflow components keep their data and wait for either a "Completion" or a "Data Collection" control message. In case of successful completion, the root partition of the initiator workflow (the workflow that receives the client request) sends a "Completion" control message to its next workflow(s) (that come next in control flow) and this message follows the normal control flow path. In case the root workflow component of the initiator workflow or any other scope, receives a fault, it first sends a "Data Collection" control message that propagates through the normal control flow path and each workflow component passes it data along that path and exits. The root workflow component receives this data and saves a copy of the data for that scope locally. It forwards the remaining data to its next workflow component(s) along with the "Data Collection" message. It then waits for a "Compensate" or a "NoCompensate" control message from the root workflow component of its outer scope.

The received data is used by the root workflow component for recovering from faults occurring in its scope or thrown by its inner scopes. In case the root workflow component wants to compensate all its inner scopes, it sends a "Compensate" control message to the root workflow components of all its inner scopes, otherwise it sends a "NoCompensate" control message to the root workflow components of all its inner scopes. Upon receiving a "Compensate" control message, the root workflow component uses the saved data to first compensate all its inner scopes and then invokes its own compensation handler. Upon receiving a "NoCompensate" control message, the root workflow component exits. In this way, all the non root workflow components keep their data till they get one of the two control messages—"Completion" or "Data Collection". The root workflow components on the other hand, keep their data till they get two control flow messages in case of a fault—1) "Data Collection" and 2) one of "Compensate" or "NoCompensate" message; and a single control flow message—"Completion" in case of successful completion.

Embodiments of the invention provide a forward fault handling mechanism for co-operating workflows. The scheme is capable of handling nested scopes. It ensures that all the components of the workflow end gracefully and none of them are left waiting for input from other workflow components (which might include erroneous components), blocking valuable resources. This scheme also ensures that all the concurrently executing workflow components stop when a fault occurs in the system ensuring quick fault propagation and hence recovery can be started earlier. This also ensures minimum resource blocking. This scheme doesn't transfer any unnecessary data between different workflow components during the normal course of operation and uses data collection only when a fault occurs. The fault handling scheme is general enough to be used for designing co-operating workflows exhibiting following characteristics: the workflow is divided into multiple components; workflow components execute independently, communicate asynchronously and have different lifetimes; and forward error recovery is more desirable.

These and other aspects of embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the embodiments of the invention without departing from the spirit thereof, and the invention includes all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS OF THE INVENTION

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the invention.

As mentioned, there is a clear need for more effective techniques for handling faults in cooperative workflow environments. The embodiments of the invention achieve this by providing a fault-handling scheme based on forward error recovery. The fault handling scheme relies on the correct placement of transaction scopes and their associated fault and compensation handlers for maintaining correct application semantics, a fault propagation scheme for forwarding faults to a workflow component that has the corresponding fault handler, and a distributed mechanism for collecting data of completed workflow components to facilitate recovering from faults. The fault handling scheme makes use of control flow messages to facilitate compensation of nested transaction scopes (residing in different components). The workflow components are also modified with additional code for aiding with fault propagation and fault recovery. As such, the present invention ensures that no workflow component in the application is left waiting for input in the event of a fault, and ensures correct recovery a fault.

Figure 1:
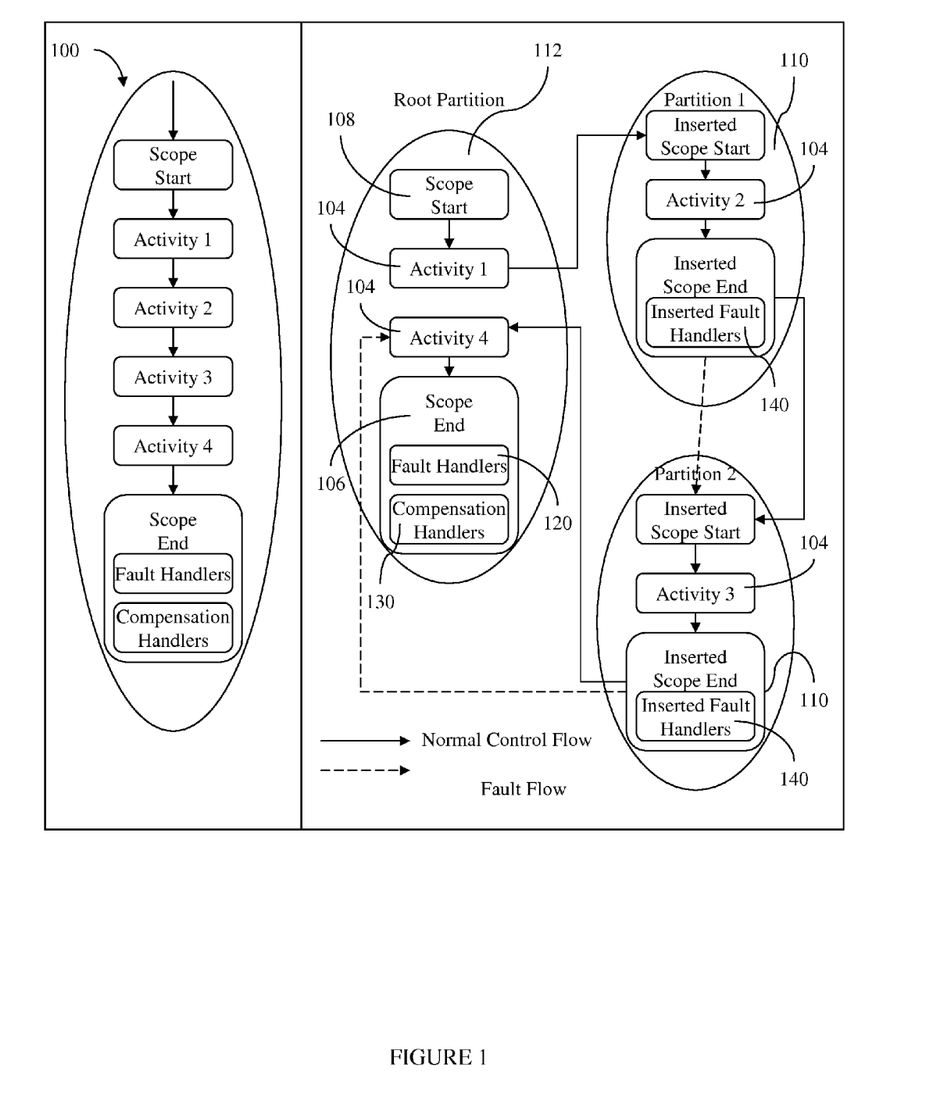
FIG. 1 illustrates the partitioning strategy for a "transaction scope" and placement of fault handlers and compensation handlers in an embodiment of the invention.
Figure 2:
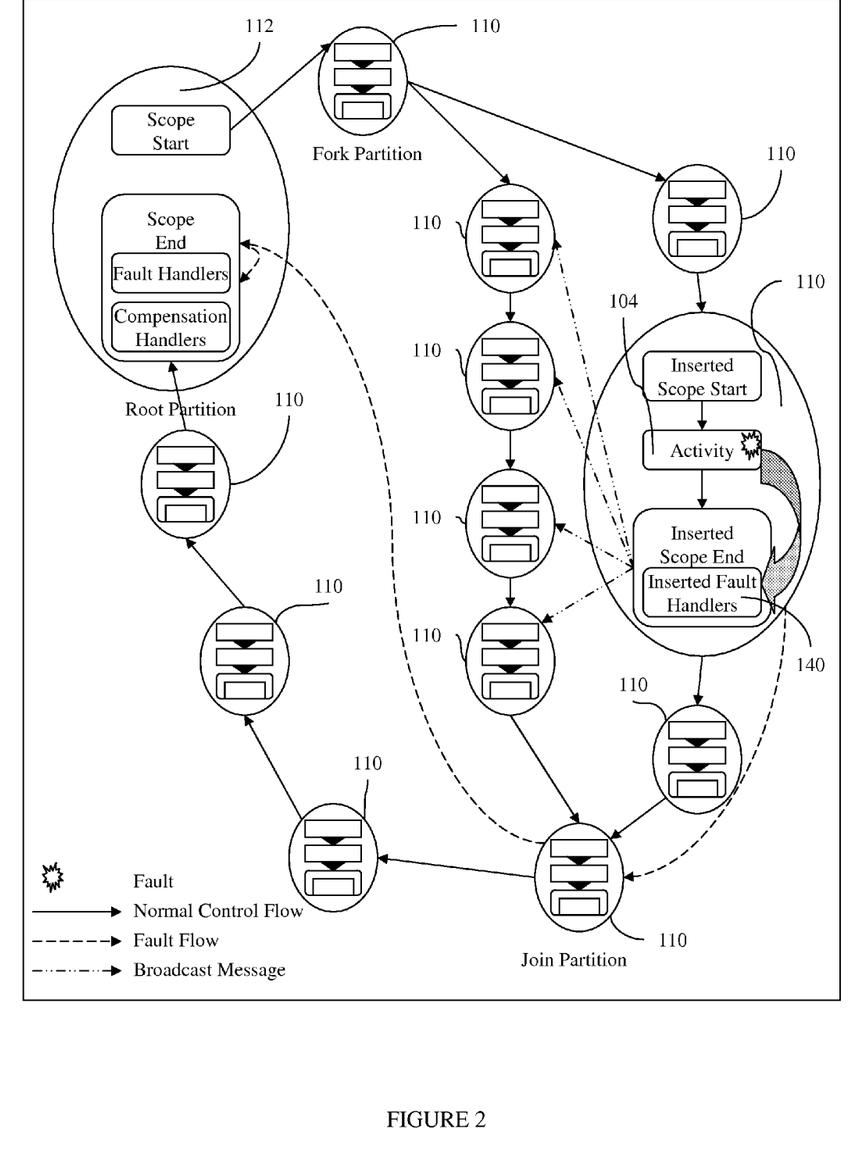
FIG. 2 illustrates the fault propagation mechanism in an embodiment of the invention.
Figure 3:
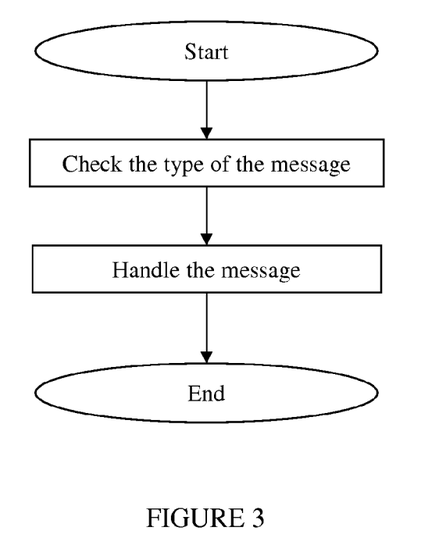
FIG. 3 is a flow chart that illustrates handling of control messages according to an embodiment of the invention.
Figure 4:
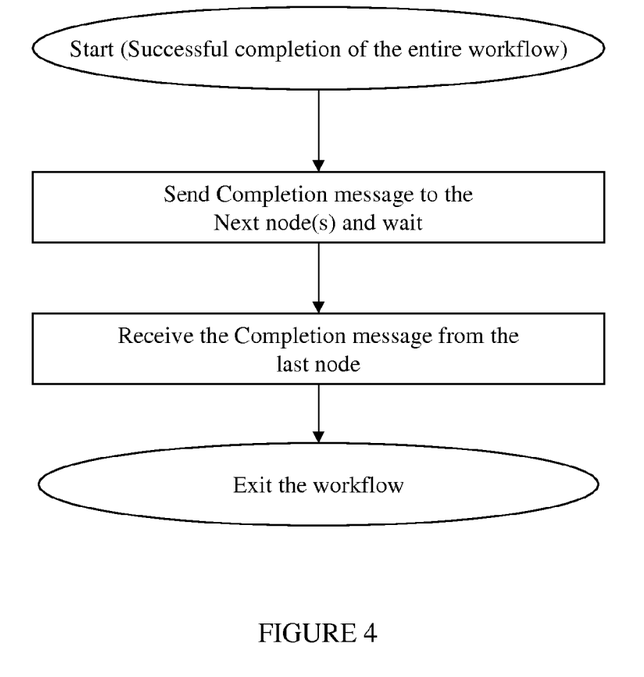
FIG. 4 is a flow chart that illustrates the initiation of completion control message by root partition of the workflow.
Figure 5:
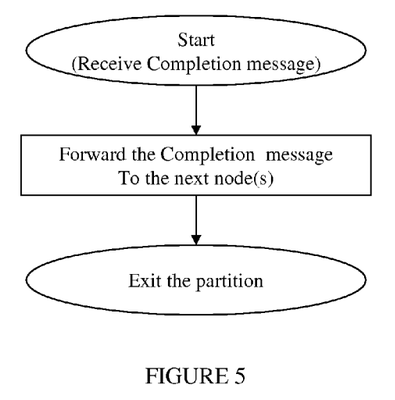
FIG. 5 is a flow chart that illustrates handling of the completion control message by non root partitions and root partitions of inner scopes.
Figure 6:
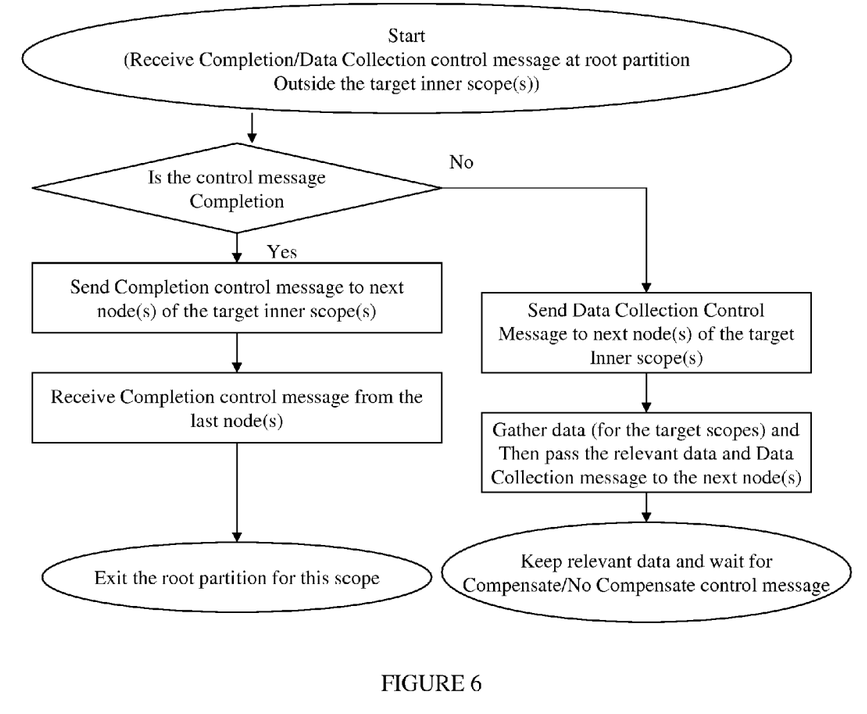
FIG. 6 is a flow chart that illustrates the data collection mechanism employed by the root partitions of successfully completed inner scopes.
Figure 7:
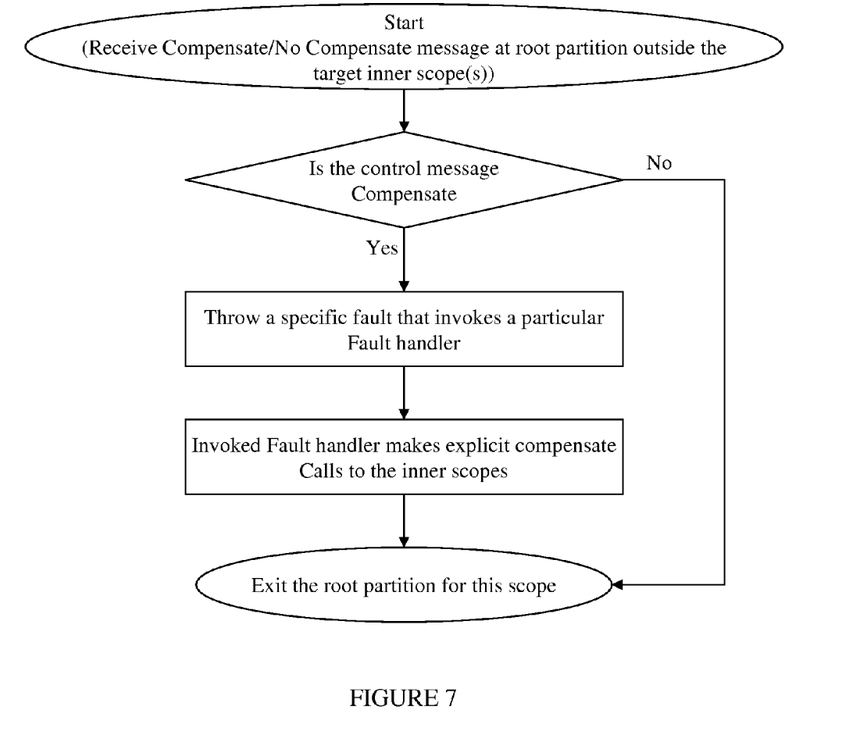
FIG. 7 is a flow chart that illustrates the compensation mechanism employed by the root partitions of successfully completed inner scopes.
Figure 8:
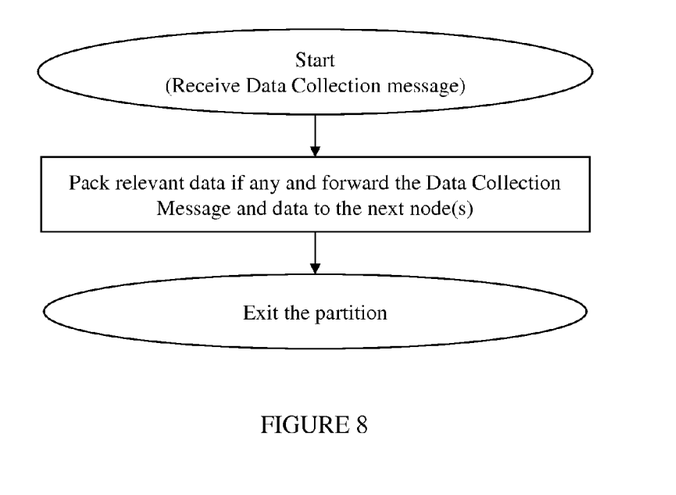
FIG. 8 is a flow chart that illustrates the handling of data collection control message by the non root partitions of a scope.

A cooperative workflow environment comprises of multiple workflow components deployed at different locations in a distributed infrastructure and working co-operatively with other components to complete an overall global task. These workflow components communicate directly with each other (rather than through a centralized controller) in an asynchronous manner to transfer data and control when necessary. These workflow components could be developed independently or developed as a single centralized workflow and then partitioned to produce these multiple workflow components. Workflow specification languages such as BPEL4WS can be used to specify composite web services in a workflow like manner. Although the mechanism of the preferred embodiment is explained in context of cooperative workflows implemented in BPEL4WS as a centralized workflow and then partitioned to produce multiple workflow components (also referred to as partitions) for the ease of clarification, the fault handling mechanism of embodiments of the invention is general and can be used with any set of co-operating workflows Workflow specification languages (such as BPEL4WS) make use of "scope" activities to define a transaction scope that provides a fault handling and recovery context. They also have fault handlers and compensation handlers that are associated with their (implicit or explicit) transaction scope. These scopes can be nested. In automatic partitioning of such a workflow, activities inside a scope may get arbitrarily partitioned and thus the scope also has to be placed correctly. Referring to FIGS. 1 and 2, embodiments of the invention partition scope 100 in such a way that scope start 108 and scope end 106 of scope 100 reside in the same partition 110. However, scope start 108 and scope end 106 can reside in different partitions as well. The node that executes the partition 110 with the end of scope is referred to as the root node for scope 100 and the partition 110 is referred to as root partition 112. The other partitions containing remaining activities 104 in a scope are referred to as non-root partitions. All activities 104 within scope 100 get partitioned following normal data flow analysis. This enables location of fault handlers 120 and compensation handlers 130 (in root partition 112) for scope 100 at the root node for scope 100.

During (automatic or manual) partitioning of a workflow, all non root partitions 110 that consist of activities 104 are inserted with additional fault handlers, referred to herein as fault handling components 140, which help in fault propagation, as shown in FIG. 2. The newly inserted fault handlers implement a fault propagation scheme according to which the faults are forwarded to either (whichever comes first):

a) nodes on all the outgoing paths which host the next join partition 110 (i.e. a partition with more than one incoming link) or b) nodes on all the outgoing paths which host the next fork partition (i.e. a partition with more than one outgoing link), or c) the root partition 112

As shown in FIG. 2, point a) and b) mentioned above helps in cleaning up workflow instances that are waiting for input from erroneous partitions; whereas, point c) helps in propagating the fault to a location where it can be handled correctly and where subsequent steps can be taken to recover from it.

Figure 9:
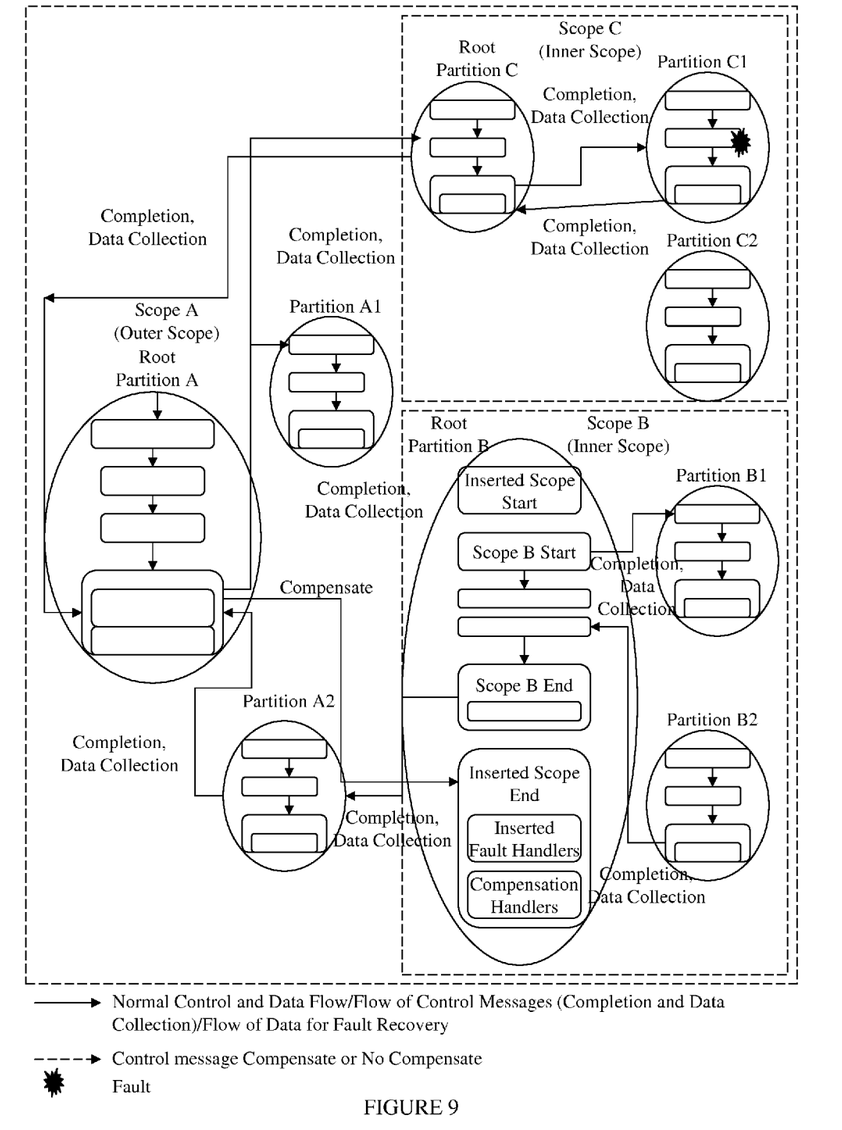
FIG. 9 illustrates the distributed data collection mechanism and flow of control messages used for recovering from faults in nested transaction scopes.

The process of fault recovery can start once the fault has been propagated to root partition 112. As described above, fault handlers 120 and compensation handlers 130 for a scope are situated in root partition 112. However, the data required by fault handlers 120 and compensation handlers 130 could be spread over all the partitions. Thus, the process of fault recovery requires data collection from all of partitions 110 followed by execution of fault handlers 120. Further, scope 100 might choose to compensate all its nested scopes in the reverse order of completion. Hence, compensation is another step in fault recovery. FIG. 9 shows an example of nested scopes with an outer scope (Scope A) and its root partition (Partition A) and two inner scopes (Scope B, Scope C) and their root partitions (Partition B and Partition C, respectively). Let us assume that a fault occurs in inner scope C and the inner scope B has finished its execution successfully.

The process of data collection begins when a fault occurs and data is needed for the following two purposes:

1. execution of activities inside fault handlers 120 for scope 100 in which the fault occurred; and
2. compensation of successfully completed inner scopes 100 (Scope B in FIG. 9)

Activities inside the fault handler 120, for the scope 100 in which the fault occurred, are executed when there is a matching catch block (or a catch A11) and the catch block has a fault handling activity that makes use of variables used in the scope 100.

Compensation of successfully completed inner scopes (Scope B in FIG. 9) occurs when there is no fault handler or no catch block matching the fault (that occurred either in the outer scope—Scope A in FIG. 9 or in some inner scope—Scope C for example (in FIG. 9), and has been thrown to the outer scope—Scope A in FIG. 9 by the inner scope) in the outer scope's (Scope A in FIG. 9) fault handler. In this case, implicit compensation must occur for all the successfully complete enclosed scopes (Scope B in FIG. 9), for which data collection is required. Compensation of successfully completed inner scopes (Scope B in FIG. 9) also occurs when there is a matching catch block (or a catch A11) in the outer scope (Scope A in FIG. 9) and it makes an explicit call to the compensate activity for a particular inner scope (Scope B in FIG. 9). Data collection has to start for all such scopes (Scope B in FIG. 9) for which there is a compensate call in the outer scope (Scope A in FIG. 9).

The data for successfully completed partitions 110 may be propagated back to root partition 112 or the data can be discarded. Similarly a root partition 112 can discard the data it receives from all the non root partitions 110 in that scope or use that data to execute activities inside its fault handler or compensation handler. What is done with this data depends on the control message received at that partition 110. The following four types of control messages are used for this purpose: "Completion" control message; "Data Collection" control message; "Compensation" control message; and "NoCompensation" control message. As shown in FIG. 3-8, each partition 110 waits for a control message and takes appropriate action based on the type of message received.

After finishing normal execution, partitions 110 keep their data and wait for either a "Completion" control message or "Data Collection" control message. In case of successful completion, root partition 112 of a scope sends "Completion" control message to the non root partitions 110 next in control flow, wherein "Completion" control message follows the normal control flow path. Upon receiving a "Completion" control message a partition discards its data, forwards the "Completion" control message to other non-root partitions which are next in the control flow and exits.

When a root partition 112, receives a fault (that has been propagated to it following the fault propagation scheme), it sends a "Data Collection" control message to the non root partitions 110 that are next in the control flow after the scope start. As such, "Data Collection" control message propagates through the normal control flow path, wherein each partition 110 receives "Data Collection" control message and appends its data (i.e. variables) to the message and forwards the message to other non-root partitions that are next in the control flow path and exits. The "data collection" control message travels along the normal path until it reaches the node where the fault has occurred. From that point onwards the "data collection" control message follows the fault propagation path until it reaches root partition 112. Root partition 112 eventually receives the sent data and saves a copy of the data locally. This process includes collecting data from any successfully completed inner scopes (Scope B in FIG. 9) as well.

Root partition 112 of the inner scope (Root Partition B in FIG. 9, for example) after collecting data from partitions within its scope, forwards the data to the partitions 110 in the outer scope (Partition A2 in FIG. 9, for example) that are next in the control flow path along with "Data Collection" control message. It then waits for "Compensation" control message or "NoCompensation" control message from the root partition (Root Partition A in FIG. 9, for example) of its outer scope (Scope A in FIG. 9, for example).

Figure 10:
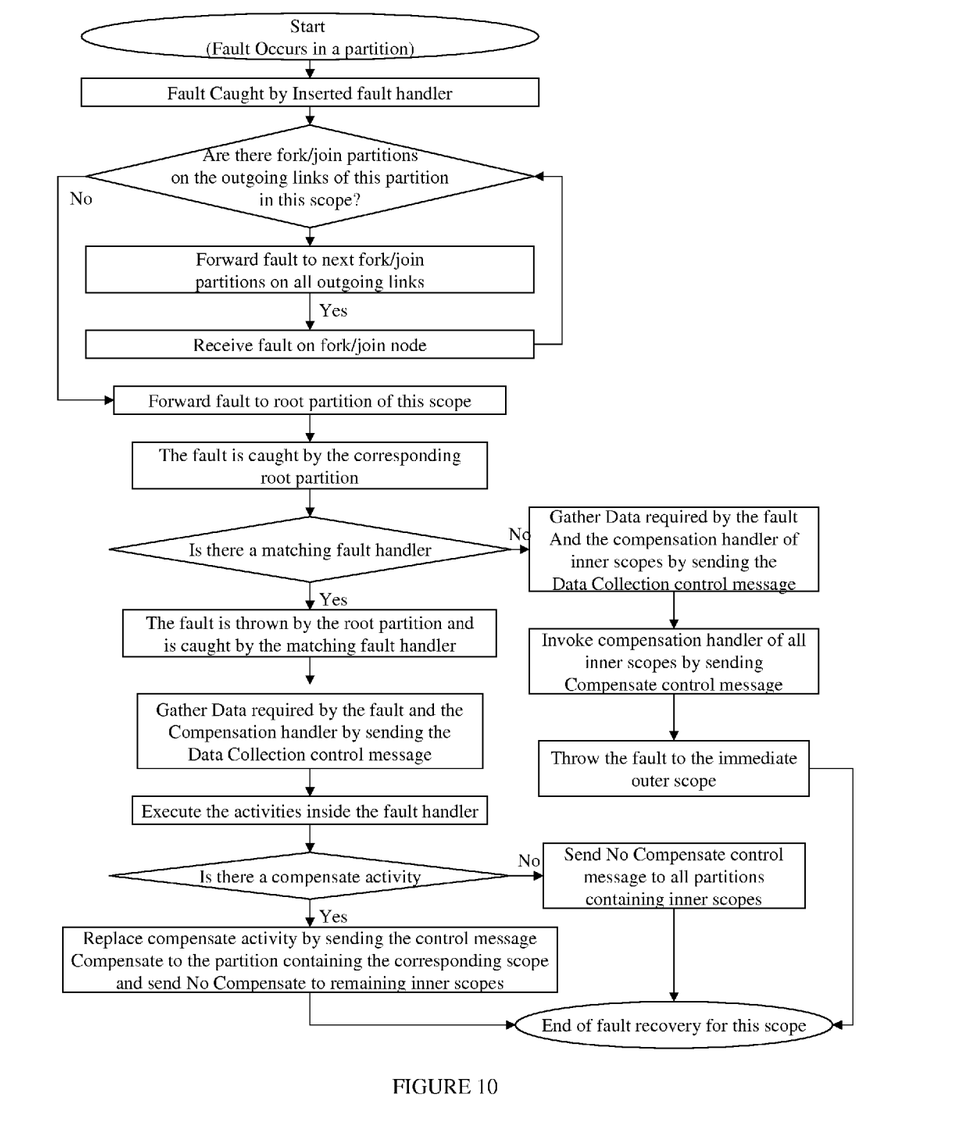
FIG. 10 illustrates a flow diagram illustrating the overall fault propagation and recovery for a "transaction scope" according to a preferred embodiment of the invention.

As shown in FIG. 10, root partition 112 executes fault handler 120 upon receiving back "Data Collection" control message and the data. If the fault is not handled in the given scope 100 it is thrown to the outer scope. The received data is used by the root partition (Root Partition A in FIG. 9) for recovering from faults in its scope (Scope A in FIG. 9) or faults thrown by its inner scopes (Scope C, for example in FIG. 9). In case the fault handler associated with the root partition (Root Partition A in FIG. 9) chooses to compensate all its successfully completed inner scopes (Scope B in FIG. 9), either by explicit compensate calls to the inner scopes (Scope B in FIG. 9) or by implicit compensation that occurs when no appropriate fault handler is present, it sends "Compensation" control message to root partitions 112 (Partition B in FIG. 9) of all its successfully completed inner scopes, otherwise it sends "NoCompensation" control message to root partitions 112 (Partition B in FIG. 9) of all its successfully completed inner scopes (Scope B in FIG. 9). The "Compensation" (or the "NoCompensation") control message (shown in FIG. 9) is received by the root partition of inner scopes (Partition B in FIG. 9). Upon receiving "NoCompensation" control message, root partition 112 (Partition B in FIG. 9) exits. Upon receiving "Compensation" control message, root partition 112 (Partition B in FIG. 9) first sends the "Compensation" control message to compensate all its inner scopes. It then invokes its own compensation handler by throwing a specific "Compensation" fault. The additional fault handler component 140, inserted in the top level implicit scope of each root partition consists of a handler for a specific "Compensation" fault. This handler simply invokes the compensation handlers of the inner scope by using an explicit "compensate" activity. This is required as a compensation handler can be invoked only from a fault handler or a compensation handler of the immediately outer scope.

Accordingly, non-root partitions 110 keep their data until one of two control messages is received—either "Completion" control message or "Data Collection" control message; whereas, root partitions 112 keeps data until both control messages are received—"Data Collection" control message and "Compensation" control message or "NoCompensation" control message in case of a fault (or "Completion" control message in case of successful completion).

In scenarios, where there are concurrent activities executing within scope 100 (which implies that there is a fork/join partition (Fork Partition and Join Partition in FIG. 2) within scope 100 and its execution occurs prior to the last activity of scope 100 in root partition 112) and one of these activities sends a fault indication, two approaches can be taken:

First, the fault is propagated to the next join partition on all outgoing links and all the other parallel paths are allowed to continue until the execution in all the parallel paths reaches the join partition. At the join partition, the fault is propagated to the root partition 112 of that scope. This scheme ensures correct program behavior, although the scheme could be inefficient in certain scenarios. For example, there might be cases where the non-erroneous parallel paths take a long time to finish, although a fault has occurred very early in another parallel path. Thus, the entire cooperative workflow environment waits for a long time before any fault recovery can be initiated and the system might have to recover from a lot of additional tasks (which were executed in the non-erroneous parallel paths). Thus, the fault recovery itself might also take a long time.

Second, an alternative scheme is to notify all the partitions in scope 100 of the fault through a broadcast message with a correlation id corresponding to that request. This message can be set to have a timeout value and it will timeout at all those partitions that have either completed their execution or are yet to start their execution for that particular request. This message is assumed to be sent over a reliable medium such as JMS™ (Java Message Service) so that the scheme does not have to care about message loss. This message is received by an asynchronous event handler in the partitions and a fault is thrown. The corresponding fault handler is invoked and the basic scheme for fault propagation (as previously described) is followed. Preferably, one would want to notify only those partitions that are currently executing any activity, which involves explicit synchronization messages to be sent either to a centralized entity or to all the partitions and maintenance of this global state during normal operation will have huge overheads.

Figure 11:
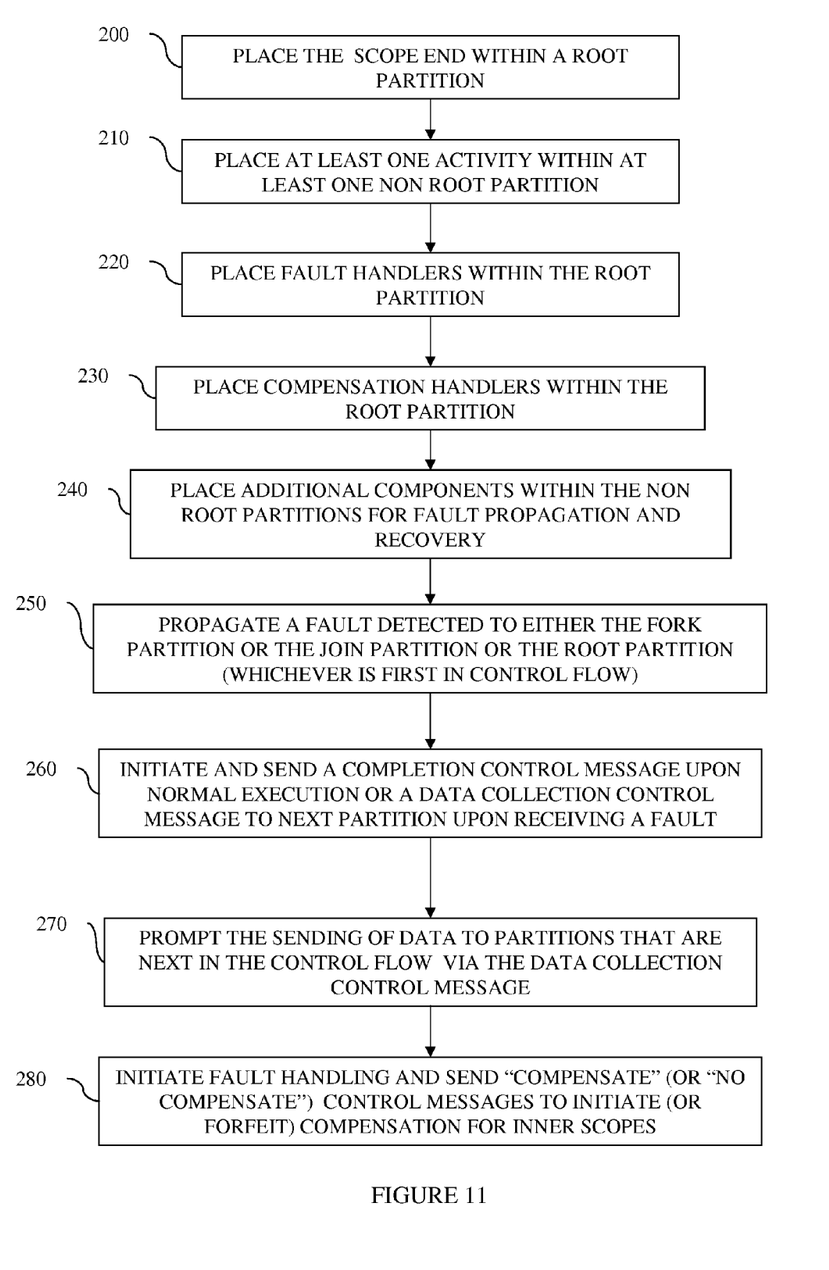
FIG. 11 illustrates a flow diagram according to a preferred embodiment of the invention.

FIG. 11 illustrates a flow diagram of a method for fault handling in a co-operative workflow environment. In item 200, the method begins by placing the scope end in a partition known as the root partition. Next, in item 210, at least one activity is placed within at least one non root partition. Embodiments of the invention comprise a plurality of partitions including the root partition and the other non-root partitions. The partitions comprise of one or more transaction scopes, wherein a scopes comprises of the scope start, a block of activities, and the scope end and its associated fault handlers and compensation handlers. The scopes can be nested within each other.

In items 220 and 230, the fault handlers and the compensation handlers are placed within the root partition. Further, in item 240, additional fault handling component is placed within the non root partitions for propagating faults. The method further comprises, in item 250, propagating a fault detected to either (which ever comes first in the control flow) a) the fork partition or b) the join partition or c) the root partition. The fault is thus eventually propagated to the root partition of a scope. The root partition upon receiving a fault initiates and sends a data collection control message to the partitions which are next in control flow (item 260), wherein the data collection control message prompts the sending of data to partitions that are next in control flow (item 270). Once the root partition, gets all the data, it can handle the received fault. As part of fault handling, it can initiate compensation if explicit compensate calls are present for inner scopes or if no appropriate fault handlers are found in that scope, then compensation is initiated for all successfully completed inner scopes (item 280). Compensation is initiated by sending a "Compensation" control message to the root partitions of appropriate inner scopes and a "NoCompensate" control message is sent to the root partitions of all the other inner scopes for which no compensation is to be performed.

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 12:
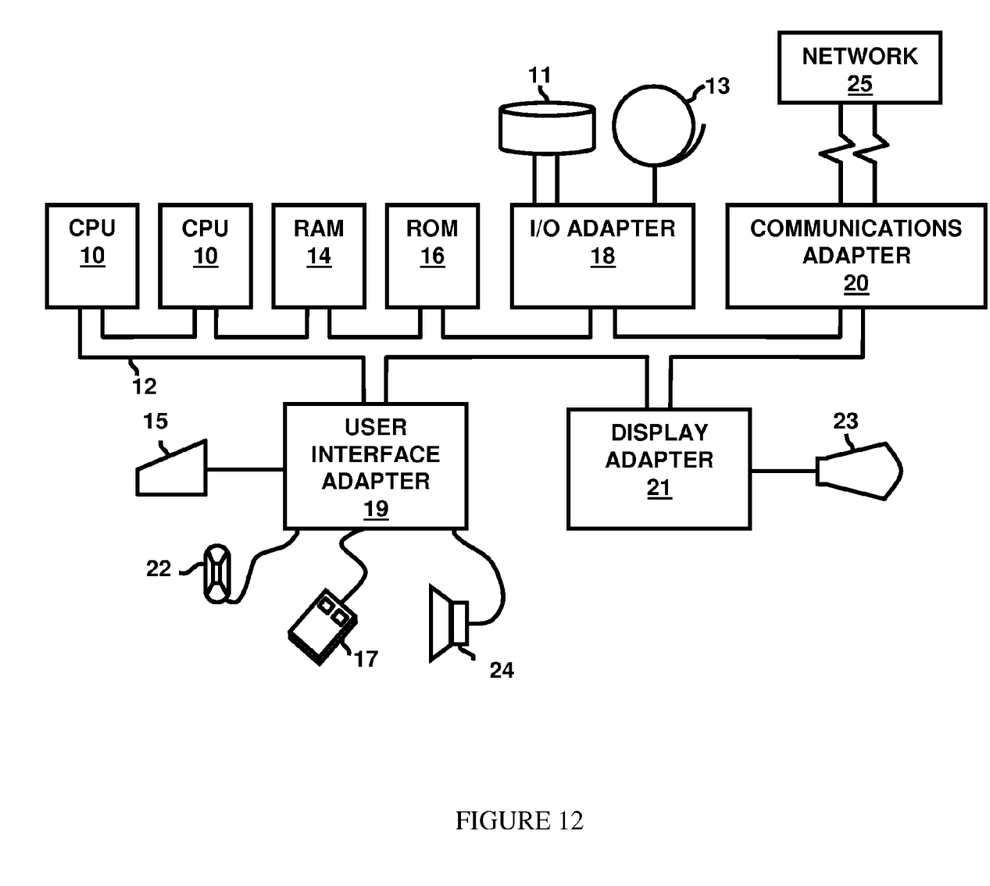
FIG. 12 is a computer system diagram according to an embodiment of the invention.

A representative hardware environment for practicing the embodiments of the invention is depicted in FIG. 12. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Accordingly, embodiments of the invention present a fault-handling scheme based on forward recovery. Such a scheme relies on the correct placement of transaction scopes 100 and their associated fault and compensation handlers for maintaining correct application semantics, a fault propagation scheme for forwarding faults to a workflow component that has the corresponding fault handling code, and a distributed mechanism for collecting data of completed scopes 100, thereby addressing the different life times of scopes 100 (residing in different components). The workflow components are also modified with additional code for aiding with fault propagation and fault recovery. As such, the present invention ensures that no workflow component in the application is left waiting for input in the event of a fault, and ensures correct recovery from a fault.

Thus, embodiments of the invention present a method, system, computer program product, etc. for fault handling in a co-operative workflow environment. The method performs a placement strategy for a transaction scope and associated fault handlers and compensation handlers across different workflow components. A plurality of workflow components comprise the transaction scope. The workflow component that has an end of the transaction scope is identified as the root workflow component for the given transaction scope and other workflow components are identified as non-root workflow components. The method provides that an end of a transaction scope resides in a root workflow component, wherein the fault handler for a given transaction scope and the compensation handler for recovering from faults resides in the root workflow component.

The method also performs a fault propagation scheme for forwarding a fault occurring in any of the workflow components to a fault handler. Specifically, the workflow components are augmented with additional fault handling code to implement the fault propagation scheme according to which the workflow component forwards a fault, that has either occurred within the workflow component or has been received from another workflow component as part of the fault propagation scheme, to one of a following workflow components, whichever comes first in a control flow path: a root workflow component of a given transaction scope; a next join workflow component; and the next fork workflow component. The join workflow component comprises a workflow component that has more than one incoming links. The fork workflow component comprises a workflow component that has more than one outgoing link.

Furthermore, the method performs a distributed data collection mechanism to facilitate recovery from a fault occurring in any workflow component. The distributed data collection mechanism is initiated by a root workflow component, by sending a data collection control message once the fault occurring in any workflow component in a scope has been propagated to a root workflow component of that scope. Moreover, data variables of the workflow components are appended to the data collection control message. Following this, the data collection control message is sent to the workflow components which are next in sequence in a control flow upon receipt of the data collection control message, wherein the method further comprises exiting if the workflow components which are next in sequence are non-root workflow components, or waiting for a compensate control message or a no compensate control message if the workflow components which are next in sequence are root workflow components.

In addition, the method performs a fault recovery mechanism using compensation, wherein the transaction scope defines a transaction boundary and provides a fault handling and a fault recovery context for a set of activities, and wherein the transaction scope is adapted to be nested inside another transaction scope to create outer and inner scopes. Moreover, the cooperative workflow environment comprises a plurality of workflow components deployed at different locations in a distributed infrastructure and working co-operatively with other components to complete an overall global task.

When performing the fault recovery mechanism, a root workflow component of a scope sends a compensate control message to root workflow components of all the inner scopes for which fault recovery has to be initiated, and the root workflow component of the scope sends a no compensate control message to root workflow components of all the inner scopes for which no fault recovery has to be done. Furthermore, the method comprises exiting normally by the root workflow components upon receipt of the no compensate control message, and initiating the fault recovery using the compensation handlers upon receipt of the compensate control message from the root workflow component of an immediate outer scope. The method further comprises sending, using a root workflow component, a completion control message in case of normal completion; and exiting normally by the workflow components upon receipt of the completion control message.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

What is claimed is:

1. A computer storage medium readable by a computer tangibly embodying a program of instructions executable by said computer to perform a method for fault handling in a co-operative workflow environment, said method comprising:

employing a placement strategy for a transaction scope and associated fault handlers and compensation handlers across different workflow components;

employing a fault propagation scheme for forwarding a fault occurring in any of said workflow components to a fault handler;

employing a distributed data collection mechanism to facilitate recovery from said fault occurring in any said workflow component;

employing a fault recovery mechanism using compensation, wherein said transaction scope defines a transaction boundary and provides a fault handling and fault recovery context for a set of activities and a said transaction scope may be nested inside another transaction scope resulting in outer and inner scopes, wherein said cooperative workflow environment comprises a plurality of said workflow components deployed at different locations in a distributed infrastructure and working co-operatively with other components to complete an overall global task, and wherein said workflow components are adapted to perform one of:
  exiting normally upon receipt of a completion control message; and
  implementing said distributed data collection mechanism by appending data variables to a data collection message and sending the said data collection message to workflow components which are next in sequence in the control flow, wherein, upon receipt of the data collection message, said workflow components are adapted to perform one of:
    exiting if said workflow components are non-root workflow components; and
    waiting for a compensate control message or a no compensate control message if said workflow components are root workflow components.

2. The computer storage medium according to claim 1, wherein a plurality of said workflow components comprise said transaction scope, and wherein said method further comprise identifying a workflow component that has an end of said transaction scope as a root workflow component for a given transaction scope and identifying other workflow components as non-root workflow components.

3. The computer storage medium according to claim 1, wherein, when employing said placement strategy, end of said transaction scope is placed in the said root workflow component, wherein said fault handlers for a given said transaction scope reside in said root workflow component, and wherein said compensation handlers for a given said transaction scope reside in said root workflow component.

4. The computer storage medium according to claim 1, further comprising augmenting said workflow components with additional fault handling code to implement said fault propagation scheme according to which said workflow component forwards a fault, that has either occurred within that workflow component or has been received from another workflow component as part of the said fault propagation scheme, to one of the following workflow components whichever comes first in the control flow path:
  the root workflow component of the given said transaction scope;
  next join workflow component; and
  next fork workflow component,
  wherein said join workflow component comprises a workflow component that has more than one incoming link and said fork workflow component comprises a workflow component that has more than one outgoing link.

5. The computer storage medium according to claim 1, further comprising sending, using a root workflow component, a completion control message in case of normal completion.

* * * * *